Figure 1:
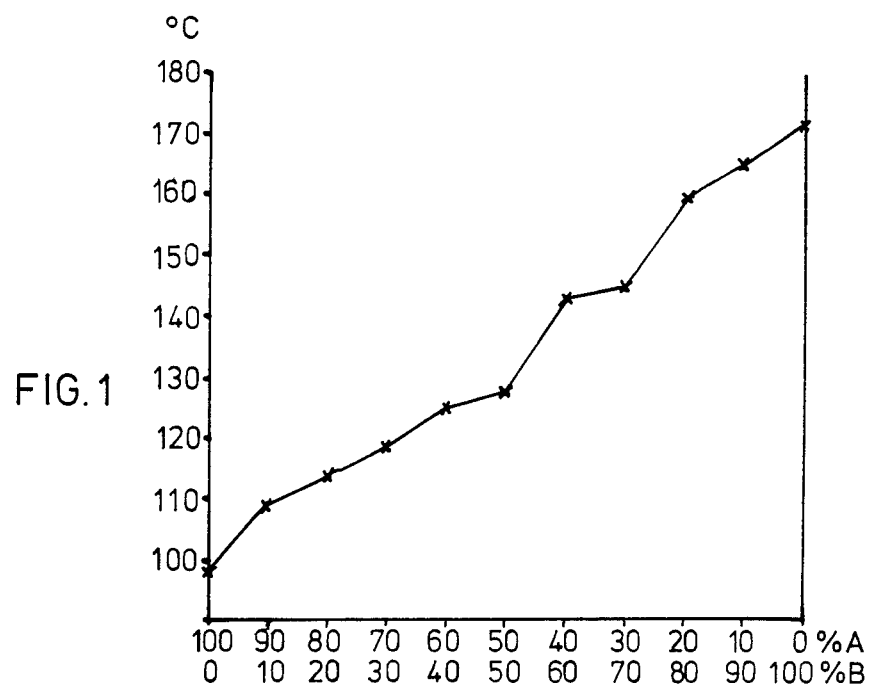

United States Patent [19]

Kleiner et al.

[11] Patent Number: 4,581,441
[45] Date of Patent: Apr. 8, 1986

[54] MIXTURES OF SPECIAL CYCLOALIPHATIC 1,2-DIEPOXIDES AND THEIR USE

[75] Inventors: Frank Kleiner, Leverkusen; Rolf Kübens, Odenthal; Heinrich Heine, Leverkusen, all of Fed. Rep. of Germany

[73] Assignee: Bayer Aktiengesellschaft, Leverkusen, Fed. Rep. of Germany

[21] Appl. No.: 670,753

[22] Filed: Nov. 13, 1984

Related U.S. Application Data

[63] Continuation of Ser. No. 549,919, Nov. 9, 1983, abandoned.

[30] Foreign Application Priority Data

Nov. 19, 1982 [DE] Fed. Rep. of Germany ....... 3242711

[51] Int. Cl.$^4$ .............................................. C08G 59/24
[52] U.S. Cl. .................................... 528/361; 252/182
[58] Field of Search .......................... 528/361; 252/182

[56] References Cited

U.S. PATENT DOCUMENTS

| | | | |
|---|---|---|---|
| 3,511,922 | 5/1970 | Ernst et al. .......................... | 174/137 |
| 3,764,584 | 10/1973 | Hope et al. ....................... | 528/361 X |
| 4,336,367 | 6/1982 | Morris et al. .................. | 528/361 X |

*Primary Examiner*—Earl Nielsen
*Attorney, Agent, or Firm*—Connolly and Hutz

[57] ABSTRACT

This invention relates to a mixture of from 60 to 95% by weight of a diglycidyl ester of hexahydrophthalic acids and from 5 to 40% by weight of 3,4-epoxycyclohexylmethyl-3,4-epoxycyclohexane carboxylate. In combination with conventional polycarboxylic acid anhydrides as hardeners, this mixture is used for the production of molded bodies with excellent weathering resistance, good electrical properties and surprisingly good mechanical properties.

4 Claims, 4 Drawing Figures

MIXTURES OF SPECIAL CYCLOALIPHATIC 1,2-DIEPOXIDES AND THEIR USE

This application is a continuation of application Ser. No. 549,919 filed Nov. 9, 1983, now abandoned.

This invention relates to a mixture of 60-95% by weight of a diglycidyl ester of hexahydrophthalic acids and 5-40% by weight of 3,4-epoxycyclohexylmethyl-3,4-epoxycyclohexane carboxylate. This mixture is used in combination with conventional polycarboxylic acid anhydrides as hardeners for the production of molded articles which have excellent weather resistance as well as good mechanical and electrical properties.

3,4-Epoxycyclohexylmethyl-3,4-epoxycyclohexane carboxylate has already been disclosed (see GB-PS 768 157, Example IV). Although the molded articles obtained when this compound is hardened with conventional polycarboxylic acid anhydrides have excellent dimensional stability under heat and good electrical properties, they are very brittle and, compared with standard epoxide resins based on bisphenol A, they have a flexural strength of only about 60% and an impact strength of only about 40%. Moreover, the hardening characteristics of these resin-hardener mixtures are substantially less advantageous than those of standard epoxide resins. The times for the onset of hardening and complete hardening are substantially longer and it is virtually impossible to process the material by modern processing methods such as injection moulding.

It is also known that cycloaliphatic 1,2-diepoxides can be hardened with cycloaliphatic or aliphatic polycarboxylic acid anhydrides when molding them and the hardened products can be used in outdoor situations on account of their advantageous electrical properties and weather resistance (see US-Pat. No. 3 511 922).

It is also known that hexahydrophthalic acid diglycidyl ester can be prepared and hardened with conventional polycarboxylic acid anhydrides (See GB-PS Nos. 1 058 075 and 1 060 016).

This epoxide resin system has numerous advantageous properties for processing (low viscosity, long operating time at room temperature, short hardening cycles at elevated temperatures, good mechanical and electrical properties and advantageous processing characteristics for injection molding) as well as having excellent resistance to outdoor conditions. One characteristic of this system, however, which is occasionally mentioned as a disadvantage, is its comparatively low dimensional stability under heat compared with that of molded standard epoxide resin products (produced from a liquid epoxide resin of bisphenol A and epichlorohydrin with an acid anhydride as hardener).

It is an object of the present invention to obtain the advantageous processing characteristics of the system consisting of hexahydrophthalic acid diglycidyl ester/-conventional polycarboxylic acid anhydrides and to maintain the same, high level of mechanical properties of the hardened molded products obtained from this system but at the same time substantially to increase the dimensional stability under heat of the hardened molded products obtained from this system. Thus, in the modified system, there should be virtually no increase in viscosity and in particular the length of the hardening cycles in injection moulding apparatus should not be increased. The flexural strength and tensile strength values as well as the impact strength values should remain virtually unchanged or if possible even be increased. Any improvement in the thermal stability under load expressed in terms of the Martens degree should amount to an increase of up to about 30° to 40° C.

This problem according to the invention was solved by using a mixture of 60-95% by weight of at least one hexahydrophthalic acid diglycidyl ester (=diepoxide A) and 5-40% by weight of 3,4-epoxycyclohexylmethyl-3,4-epoxycyclohexane-carboxylate (=diepoxide B) instead of hexahydrophthalic acid diglycidyl ester for the process of hardening with conventional polycarboxylic acid anhydrides.

The solution to this problem according to the invention is surprising in various respects.

Since, in mixtures of, for example, two diepoxide components A and B, the properties of A (100%) generally tend to change in the direction of the properties of B (100%) substantially in proportion to the extent that the proportion of B is increased and the proportion of A is decreased (see FIG. 1, change in dimensional stability under heat), it was surprising to find that the gelling times (see Table 1) of mixtures of A and B together with a conventional polycarboxylic acid anhydride and accelerator were shorter than those of diepoxide A instead of being intermediate between the values of A and B, bearing in mind that the gelling times of diepoxide A with hardener and accelerator are always much shorter than those of corresponding mixtures of diepoxide B, even at different hardening temperatures. This applies even to a hardening temperature of 160° C. and mixtures of A and B containing up to 40% by weight of B. Short gelling times correspond to short hardening cycles, which are advantageous, especially for injection molding.

Figure 2:
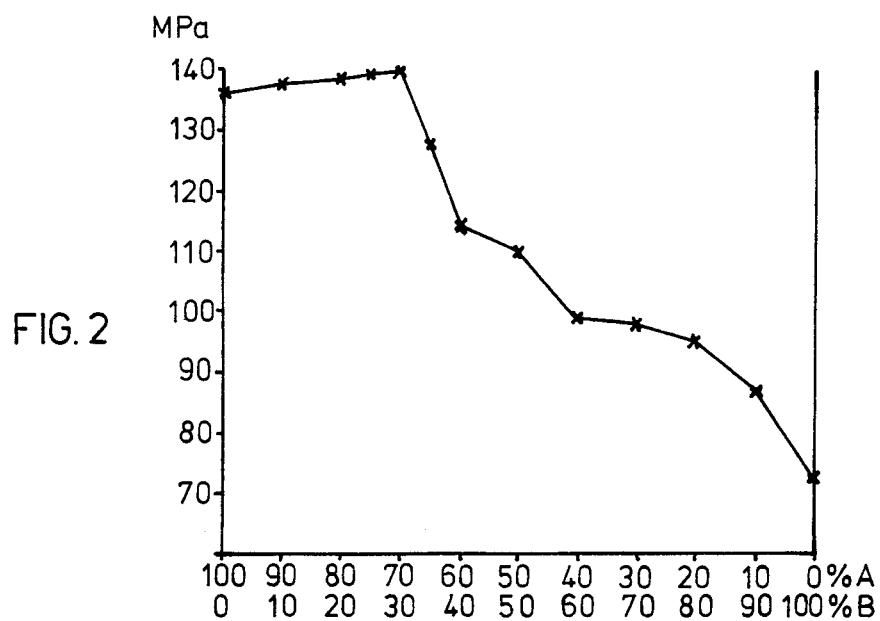

Furthermore, it was not foreseeable that hardened molded products obtained from mixtures of diepoxides A and B (percentage content of B up to 30% by weight) would have an even higher flexural strength than molded products based on diepoxide A without any diepoxide B content (see FIG. 2). The same applies to the tensile strength (see FIG. 3) for mixtures of diepoxides A and B having a diepoxide content B of up to 25% by weight. It was also to be expected that impact strength values of mixtures containing diepoxide A and B with up to 30% by weight of B would decrease much more sharply (see FIG. 4) than is in fact the case.

Bearing in mind the gelling times and mechanical properties, epoxide mixtures suitable for use in practice should contain up to 40% by weight of diepoxide B.

The present invention thus relates to mixtures of
60-95% by weight, preferably 70-95% by weight, of diglycidyl ester of hexahydrophthalic acids, and
5-40% by weight, preferably 5-30% by weight, of 3,4-epoxycyclohexylmethyl-3,4-epoxycyclohexane carboxylate.

The diglycidyl esters of hexahydrophthalic acids, which also include industrial qualities, generally have an epoxide equivalent of from 160 to 200 and a viscosity at 25° C. of from 300 to 2500 mPas.

3,4-Epoxycyclohexylmethyl-3,4-epoxycyclohexanecarboxylate, also including industrial qualities, generally has an epoxide equivalent of from 120 to 180 and a viscosity at 25° C. of from 300 to 2000 mPas.

The term "epoxide equivalent" means the quantity of epoxide compound in grams containing one 1,2-epoxide group.

The present invention also relates to a process for the production of molded epoxide resin bodies by hardening at least one 1,2-epoxide compound containing more than one 1,2-epoxide group per molecule with from 0.6 to 1.2 anhydride equivalents of a conventional polycarboxylic acid anhydride per epoxide equivalent at temperatures of from 60° to 180° C., optionally at excess pressure and optionally in the presence of a conventional hardening accelerator, fillers, dyes, pigments and reinforcing materials, characterised in that the 1,2-epoxide compound used is a mixture of 60–95% by weight of diglycidyl ester of hexahydrophthalic acids and
5–40% by weight of 3,4-epoxycyclohexylmethyl-3,4-epoxycyclohexane carboxylate.

The term "conventional polycarboxylic acid anhydrides" means aromatic, aliphatic and cycloaliphatic polycarboxylic acid anhydrides or mixtures thereof.

The following are examples: phthalic acid anhydride, tetrahydrophthalic acid anhydride, hexachloroendomethylenetetrahydrophthalic acid anhydride, endomethylene-tetrahydrophthalic acid anhydride, methyl-endomethylene-tetrahydrophthalic acid anhydride, hexahydrophthalic acid anhydride, methylhexahydrophthalic acid anhydride, succinic acid anhydride, maleic acid anhydride, dodecenylsuccinic acid anhydride, preferably liquid or low melting (m.pt.<60° C.) cycloaliphatic dicarboxylic acid anhydrides. Hexahydrophthalic acid anhydride and cis-3- and/or 4-methylhexahydrophthalic acid anhydride are particularly preferred.

From 0.6–1.2, preferably from 0.9–1.1 anhydride equivalents of the polycarboxylic acid anhydride are used per epoxide equivalent.

Conventional hardening accelerators may be used in quantities of from 0.1 to 1.5% by weight, based on the mixture of diepoxide and hardener. Tertiary amines are preferably used, for example dimethylbenzylamine.

Fillers, dyes, pigments, flame retarding substances, mold release agents and/or reinforcing materials may be added in the usual quantities to the hardenable mixtures of diepoxide, polycarboxylic acid anhydride and optionally accelerators before hardening is carried out. Examples of suitable fillers include powdered quartz, aluminium oxide, aluminium hydroxide, calcium carbonate, and calcium-magnesium carbonate. The reinforcing materials used may be, for example, fibers, threads, non-woven webs or woven webs of glass, polyester, nylon, polyacrylonitrile, silk, cotton, carbon fibers, etc.

The hardenable mixtures of diepoxide, polycarboxylic acid anhydride and optionally accelerators and additives may be used as casting resins, injecting molding resins, impregnating resins, etc.

The hardened, molded products are preferably used in the electrical insulating field.

The parts and percentages given in the experimental part are based on weight unless otherwise indicated.

EXAMPLES

Commercial hexahydrophthalic acid diglycidyl ester (=diepoxide A) having an epoxide equivalent of 160 and a viscosity of 900 mPas determined at 25° C. is used to determine the gelling times in Table 1 and the values for dimensional stability under heat and mechanical properties in FIGS. 1 to 4. The commercial 3,4-epoxycyclohexylmethyl-3,4-epoxycyclohexane-carboxylate (=diepoxide B) used has an epoxide equivalent of 160 and a viscosity of 600 mPas, determined at 25° C. The hardener used is commercial, liquid methyl hexahydrophthalic acid anhydride having an anhydride equivalent weight of 168 and a viscosity determined at 25° C. of 40 mPas. The hardener is used in a quantity corresponding to 0.95 anhydride equivalents of hardener per epoxide equivalent of diepoxide A or diepoxide B or of mixtures of diepoxides A and B. In addition, 1% of dimethylbenzylamine, based on the quantity of diepoxide A or B and hardener or of mixtures of diepoxide A and B and hardener is used as a hardening accelerator.

The gelling times at various temperatures of diepoxides A and B and mixtures thereof, in all cases mixed with hardener and accelerator as indicated above, are shown in Table 1.

The tests produce a surprising result. It would have been expected that, in view of the shorter gelling times of reaction mixtures containing diepoxide A compared with those containing diepoxide B, the gelling times of mixtures of diepoxides A and B would increase in proportion to the diepoxide B content and finally reach the values for mixtures containing diepoxide B alone. It was surprisingly found, however, that in some of the mixtures, the gelling times were below those containing 100% of diepoxide A.

TABLE 1

| % Diepoxides | | Gelling time in seconds at | | |
|---|---|---|---|---|
| A | B | 123° C. | 140° C. | 160° C. |
| 100 | 0 | 600 | 200 | 86 |
| 90 | 10 | 485 | 130 | 60 |
| 80 | 20 | 470 | 127 | 68 |
| 70 | 30 | 360 | 123 | 71 |
| 60 | 40 | 315 | 165 | 75 |
| 50 | 50 | 415 | 170 | 88 |
| 40 | 60 | 420 | 200 | 95 |
| 30 | 70 | 425 | 210 | 114 |
| 20 | 80 | 577 | 340 | 147 |
| 10 | 90 | 811 | 415 | 230 |
| 0 | 100 | 900 | 900 | 760 |

Diepoxides A and B and mixtures of diepoxides A and B were mixed with hardeners and accelerators in the proportions indicated above for testing the thermal stability under load and mechanical properties as shown in FIGS. 1 to 4, the mixtures being hardened for 4 hours at 80° C. and subsequently for 16 hours at 150° C.

FIG. 1 shows the Martens thermal stabilities under load (according to DIN 53 458) in °C. (ordinate) of the hardened samples in dependence upon mixtures of diepoxides A and B (abscissa; proportions of A and B in the mixtures expressed in percentages). Starting from a Martens degree of about 98° C. for the pure diepoxide A, the Martens degree increases, as would be expected, substantially in proportion to the increasing proportion of diepoxide B to about 172° C., which is the value for pure diepoxide B.

FIG. 2 shows the variation in the values for flexural strength in mPa of the hardened samples determined according to DIN 53 452 in dependence upon diepoxides A and B and their mixtures (mixing proportions in %). Starting from 100% of diepoxide A, it is completely surprising to find that the numerical values of the flexural strengths for mixtures of A and B having a percentage content of B of up to about 30% are even slightly greater than that of diepoxide A. One would have expected the flexural strength to decrease proportionately with increasing percentage content of B.

Figure 3:
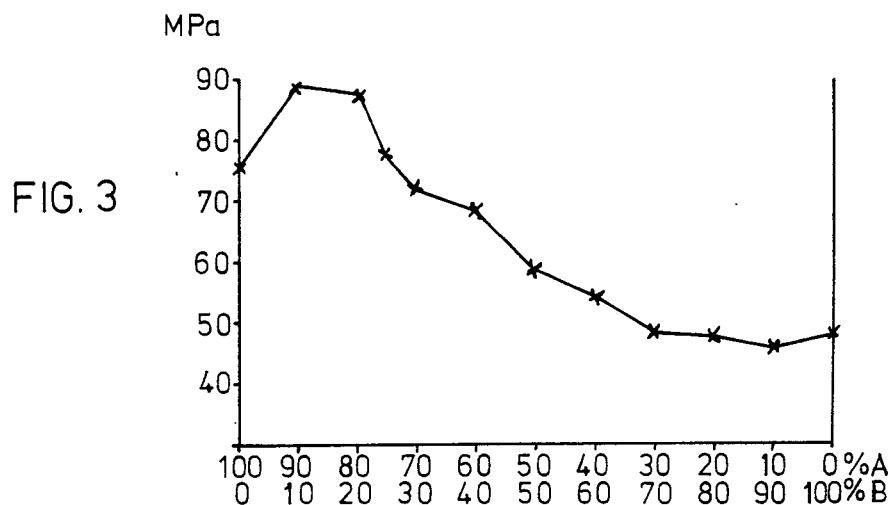

FIG. 3 represents the tensile strength (maximum tear resistance) of the hardened samples in mPa determined according to DIN 53 455 in dependence upon mixtures of diepoxides A and B (mixing proportions in %). It is surprisingly found that the tensile strength values of mixtures of diepoxides A and B having percentage contents of B of up to about 25% are higher than those of samples containing 100% of diepoxide A.

Figure 4:
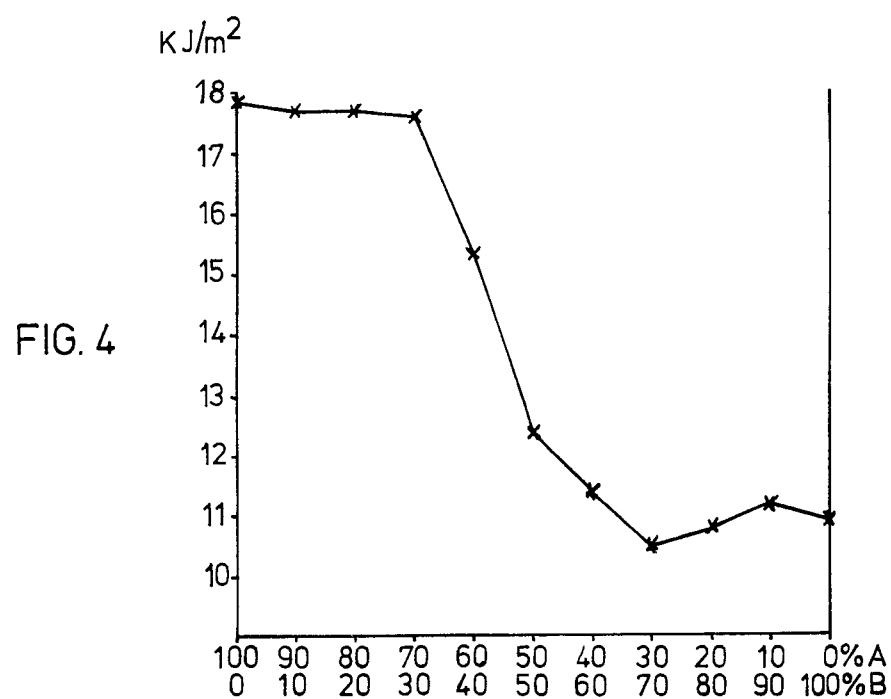

FIG. 4 shows the variation in impact strength of hardened samples in kJ/m$^2$ determined according to DIN 53 453 in dependence upon mixtures of diepoxides A and B (mixing proportions in %). Mixtures of diepoxides A and B having a percentage content of B of up to 30% give rise to samples which have impact strength values of the same level as those of samples produced from pure diepoxide A. One would have expected a proportional decrease in these values corresponding to the increasing percentage content of B.

We claim:

1. A mixture comprising:
   60–95% by weight of at least one diglycidyl ester of hexahydrophthalic acid, and
   5–40% by weight of 3,4-epoxycyclohexylmethyl-3,4-epoxycyclohexane carboxylate.

2. A mixture as claimed in claim 1, comprising:
   70–95% by weight of at least one diglycidyl ester of hexahydrophthalic acid, and
   5–30% by weight of 3,4-epoxycyclohexylmethyl-3,4-epoxycyclohexane carboxylate.

3. A process for the production of molded epoxide resin products, which comprises hardening a mixture as claimed in claim 1 with from 0.6 to 1.2 anhydride equivalents of a polycarboxylic acid anhydride per epoxide equivalent at a temperature of from 60° to 180° C., optionally under excess pressure and optionally in the presence of a conventional hardening accelerator, filler, dye, pigment or reinforcing material.

4. A process as claimed in claim 3, wherein from 0.9 to 1.1 anhydride equivalents are used per epoxide equivalent.

* * * * *

UNITED STATES PATENT AND TRADEMARK OFFICE
CERTIFICATE OF CORRECTION

PATENT NO. : 4,581,441
DATED : April 8, 1986
INVENTOR(S) : Kleiner et al

It is certified that error appears in the above-identified patent and that said Letters Patent is hereby corrected as shown below:

In the cover page, left-hand column, under "[75] Inventors:", line 2, change "Kübens," to read --Kubens,--.

Signed and Sealed this

Fifteenth Day of July 1986

[SEAL]

Attest:

DONALD J. QUIGG

Attesting Officer

Commissioner of Patents and Trademarks